Sept. 8, 1959  W. E. MILLER  2,903,406
CONDUCTING DIAPHRAGMS
Filed June 28, 1956

INVENTOR.
Walter E. Miller
BY
Bacon & Thomas
ATTORNEYS

2,903,406

CONDUCTING DIAPHRAGMS

Walter E. Miller, Haworth, N.J., assignor to Clayton Manufacturing Company, El Monte, Calif., a corporation of California Application June 28, 1956, Serial No. 594,413

20 Claims. (Cl. 204—296)

This invention relates to conducting diaphragms and more particularly to diaphragms made of ion exchange materials for employment in electrolytic processes.

Ion exchange materials are solid materials which are permeable by water and contain a large number of replaceable groups which ionize in water. In the case of anion exchange material, such groups ionize as anions and can be replaced by other anions, and, in the case of cation exchange material, such groups ionize as cations and can be replaced by other cations. Also, when saturated with water, ion exchange materials conduct electricity by migration of ions therethrough. They are furthermore selective with respect to the type of ions which will thus migrate. When subjected to an electric potential, anions can migrate through anion exchange material by successive replacement of other anions but migration of cations through such material is resisted since replaceable cations are not present. Similarly, cations can migrate through cation exchange material, but migration of anions is resisted since such material contains no replaceable anions.

If ion exchange material is positioned between electrolytes in an electrolytic process, the current which actually passes through anion exchange material is largely carried by anions and the current which actually passes through cation exchange material is largely carried by cations. It is even possible to obtain selectivity as between different cations depending upon the replacement potential of the various cations and the same is true of different anions. By employing effective diaphragms of ion exchange materials in electrolytic processes, the carrying of current can be largely restricted to the desired ions so that current efficiencies in such processes for desired results can usually be substantially increased and if, at the same time, the conductivity of the diaphragms is reasonably high, the overall efficiency of the process is substantially increased. Also, it is many times possible to provide new processes producing results not obtained in prior electrolytic processes employing diaphragms through which both anions and cations can pass with equal facility.

Continuous sheets of both anion and cation exchange resins have been produced and their use as diaphragms in electrolytic processes has been suggested. As is well known, ion exchange resins are partially polymerized synthetic resins. The structure of ion exchange resins must be such that water can reach the active ionizing groups in the interior of the particles or sheets in order to cause such groups to ionize. During the polymerization of the resins, sufficient cross linking must take place to render the resins insoluble in water but the cross linking must be stopped before the resins become impermeable by the water. It has been found that the polymerization of ion exchange resins must be stopped at a stage at which the resins soften and swell in water. At this stage, the resins do not have their maximum mechanical strength. That is to say, the sooner the polymerization is stopped, the less the mechanical strength, and, on the other hand, the further the polymerization is carried, the less the conductivity of the resin. In making continuous sheets of ion exchange resins for use as diaphragms, a compromise has had to be made at a point between maximum conductance and maximum mechanical strength. Furthermore, such sheets must be kept wet at all times since they shrink and crack when allowed to dry in the atmosphere.

Both anion and cation exchange resins in the form of discrete particles and usually in the form of beads or small spheroids can be purchased commercially and are employed in large quantities in commercial ion exchange processes. It has been found that they are quite good conductors of electricity when wet and even though they shrink when dry and swell when again saturated with water, they are not harmed by drying due to contact with the atmosphere. They have sufficient mechanical strength when wet to be employed in beds for ion exchange purposes. Ion exchange diaphragms have been produced by filling the interstices between particles of such ion exchange resins with the same or different type of resin polymerized in situ or by filling the interstices between the particles with other thermoplastic polymerized materials. Such processes usually require prolonged curing treatment at high temperatures and pressures to polymerize, vulcanize, or set the filler material and produce satisfactory diaphragms. During such curing treatment, a substantial part of the moisture content of the original resin particles may be removed, and some times modification of the ion exchange capacity of the resin material in the finished diaphragm results. The diaphragms produced in this manner must be soaked in water for a substantial period of time to permit reabsorption of moisture, and, in the course of such treatment, the resin particles swell, causing distortion of the diaphragms, and, in some instances causing the diaphragms to develop leaks. Attempts have been made to use polystyrene and similar polymerized resins as binding materials for moist resin particles, while retaining a substantial amount of the moisture content of such resin particles. This complicates the curing process, adds to the length of time required for production of the resin diaphragms, and the resultant diaphragms are consequently rather expensive. Moreover, diaphragms constructed by any of the above-described methods are relatively rigid, and once they develop leaks cannot be readily repaired, nor can the ion exchange particles used in constructing such diaphragms be recovered for reuse.

It is an object of the present invention to provide an improved conducting diaphragm for electrolytic processes.

Another object of the invention is to provide an improved conducting diaphragm of ion exchange material which has an electrical conductivity at least as high as known existing ion exchange films and membranes, but which may be produced at a fraction of their cost.

Another object of the invention is to provide an improved flexible conducting diaphragm containing ion exchange resin particles, which diaphragm may be deformed or reshaped without cracking and which is self-sealing under low temperatures and pressures to thereby avoid leakage.

Another object of the invention is to provide an improved conducting diaphragm in which particles of ion exchange resins employed as the conducting material are held together by a jelly-like, pressure-deformable, non-conducting binding material from which such resin particles may be readily recovered for reuse.

A further object of the invention is to provide an improved conducting ion exchange resin diaphragm which may be reshaped to adapt itself to the configuration of a particular electrolytic cell structure.

Another object of the invention is to provide an improved process for making a conducting diaphragm for electrolytic processes.

A further object of the invention is to provide an improved process for making a conducting ion exchange resin diaphragm for electrolytic processes from ion exchange resin particles and non-conducting filler material, wherein the materials may be mixed and molded at low temperature and pressure into a flexible, pressure-deformable sheet or layer.

A further object of the invention is to provide a process for producing a conducting diaphragm for electrolytic use in which process ion exchange resin particles containing a substantial amount of moisture may be mixed with binding material at a temperature below that which will drive off the moisture from such resin particles, and wherein the resulting mass may be molded into a flexible diaphragm requiring no curing treatment.

Further objects and advantages of the invention will appear in the following description taken in connection with the accompanying drawings, in which.

Figure 1:
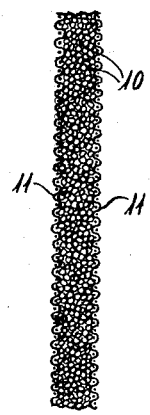
Fig. 1 is a fragmentary cross section through a diaphragm in accordance with the present invention, with the particles of ion exchange resin shown on an enlarged scale.

In accordance with the present invention, it has been discovered that the interstices between particles of ion exchange resin may be filled with a relatively inexpensive, water-insoluble, non-conducting, pressure-deformable, jelly-like material to provide a diaphragm of good conductivity which is not subject to cracking and which may be readily repaired if leaks develop. The filler material of the invention is selected from that class of substances which are capable of flow under low temperatures and pressures, and which exhibit sufficient adhesiveness to readhere to form a cohesive mass after having been subdivided. Materials which may be mechanically worked at room temperatures or at very slightly elevated temperatures under low pressure are particularly satisfactory.

The process of the invention, in general, comprises mixing the ion exchange particles with the non-conducting material until a substantially homogeneous mass is obtained, and then forming the resulting mass into a desired shape with the ion exchange particles in contact with each other, and the non-conducting material filling the interstices between such particles.

The ion exchange resin particles used in the diaphragms of the invention may be of either the cationic or anionic type and may be either strongly acidic or basic or weakly acidic or basic. While the strongly acidic and basic types provide the highest electrical conductivity, the weakly acidic or basic types usually provide a higher degree of ionic selectivity in electrolytic separation. Suitable anionic exchange resin materials include those described in U.S. Patents 2,681,319 and 2,636,851, many of which materials are commercially available. Suitable cationic exchange resin materials include those described in U.S. Patents 2,681,320 and 2,636,851, many of which materials also are commercially available.

The size of the resin particles may vary within relatively wide limits. Successful diaphragms have been made with resin particle sizes varying between 20 mesh and 200 mesh. It is preferred, however, to use particles in about the 50 mesh range (U.S. standard sieve). Too fine a mesh, as for example 400, provides a rubbery diaphragm with a rather low conductivity. The shape of the resin particles is not critical. Most commercial ion exchange resins are supplied in the form of beads or spheroidally shaped particles, but granular or irregularly shaped particles also may be used.

It is important that the resin particles contain a substantial amount of moisture. For example, the resin particles may be thoroughly saturated by soaking in water overnight, and may then be drained on flash-dried to remove the adhering surface water. Flash-drying may be accomplished by applying suction to the resin particles in a Buchner funnel for approximately 10 minutes to remove the free excess water. The resin so treated still contains approximately 42% water, i.e. 42% of the total weight of the resin thus prepared is water; the resin if dried at 120° F. would weigh about 58% of the weight of the flash-dried resin. It will be understood that the exact quantity of water will vary, depending on the particular resin used, and that resin particles containing lesser amounts of water than required for complete saturation may also be used for production of successful diaphragms. However, it is preferable that the resin particles be utilized in saturated condition since diaphragms made from such materials are highly conductive substantially immediately, and do not swell or distort in use.

The resin particles incorporated in the diaphragm structure may be in hydrogen or acidic form where cationic resins are employed or may be in salt form depending upon the intended use. When anionic resins are employed, such resins may be in either hydroxyl or salt form. Thus, the resin beads may be soaked in solutions of acids, bases, or salts to convert them into the desired form before incorporation in the diaphragm structure.

The filling and binding material may be selected from any of a number of jelly-like or waxy substances which have the property of forming a cohesive, workable mass under low temperatures and pressures. Such materials exhibit a certain tackiness which enables them to readhere or reform to a continuous phase after subdivision. Petrolatum and the amorphous or microcrystalline mineral waxes derived from petrolatum have been found to be especially suitable for filling the interstices between the resin particles, and for holding such particles together. The filler material is preferably one which may be readily worked and formed at temperatures well below the boiling point of water and preferably below the melting temperature of the filler material. Petrolatum, for example, has a melting point in the range of from about 93° F. to 129° F. and is readily worked by troweling and the like at room temperatures. The amorphous waxes have melting points usually variable in the range of from 130° F. to 185° F., but may be readily worked and mixed with the resin particles at pressures which may be applied by hand at temperatures well below the melting point of the wax. All of these substances are chemically and physically stable and are capable of forming self-supporting diaphragms with resin particles where such diaphragms are not unduly large. Such diaphragms may be readily formed into the frames of electrolytic cells for immediate use without curing, soaking, or other pretreatment. Diaphragms to be used in electrolytic processes which may be carried out at relatively low temperatures, as, for example, below about 30° C., may be made with petrolatum alone as the binding material. Diaphragms to be used in electrolytic processes requiring higher temperatures may be constructed by using mixtures of petrolatum with the amorphous waxes and in some instances the amorphous waxes may be used alone. The higher-melting waxes of the latter type are somewhat more difficult to manipulate in the mixing and molding procedure. Accordingly, in order to obtain the maximum advantage of easy manipulation in the mixing of the resin particles with the filler material and in the molding of the resulting diaphragms while at the same time providing a diaphragm structure of good stability at the higher temperatures, mixtures of the amorphous waxes with petrolatum are preferred. Diaphragms of satisfactory physical stability at temperatures of 50° C. and below are readily constructed with ion exchange resin-petrolatum-wax mixtures. Where the mixtures of wax and petrolatum are used, these materials may be placed together in the desired proportions, heated above their melting point, and stirred to make a homogeneous solution. Ratios by weight of petrolatum to amorphous wax of 1 to 1 and of 1 to 2 comprise very satisfactory mixtures. However, it will be understood that any ratio between 100% petrolatum and 100% amorphous wax may be utilized for special purposes. By combining petrolatum with wax, a mixture of higher melting point may be obtained than by use of petrolatum alone, and the resulting diaphragm has greater rigidity. It is to be understood that the amorphous waxes are quite different in characteristics from paraffin wax and other waxes of the crystalline type. The latter waxes exhibit greater rigidity, and are subject to cracking upon flexing or bending of a diaphragm structure. Moreover, such waxes do not as readily readhere at temperatures below their melting point to form a cohesive mass once they have been subdivided. While paraffin wax and other crystalline waxes may be utilized to produce conducting diaphragms, it is usually necessary to perform the mixing and molding operations at an elevated temperature with a consequent loss of moisture by the resin, which results in a lower conductivity for the diaphragm as well as being subject to the other disadvantages discussed above. It will be understood, however, that small amounts of paraffin wax and other waxes may be incorporated with petrolatum, amorphous wax, and wax-petrolatum mixtures.

The petrolatum and amorphous waxes may be used directly as supplied commercially, or if they are to be used in making diaphragms for contact with acids they may be boiled prior to use with a concentrated mineral acid. For example, where an anionic diaphragm is to be constructed, the filler material may be boiled with about 20% by weight of sulfuric acid. Where the filler materials are to be used for constructing diaphragms for contact with bases, they may be boiled with a strong alkali. For example, where a cation exchange resin diaphragm is to be prepared, the filler material may be boiled with 10% by weight of sodium hydroxide. Alternatively, the petrolatum and/or waxes may be treated successively with both the sulfuric acid and sodium hydroxide.

The ion exchange resin particles and the filler material, such as petrolatum, amorphous wax, or petrolatum-amorphous wax mixtures, are thoroughly mixed together in any suitable manner. The mixture may be made at room temperature or at slightly elevated temperatures. While the latter procedure provides a more easily worked mass, such temperatures should not be so high that moisture will be driven out of the resin particles. The mixing should be thoroughly conducted to form a homogeneous mass. Small samples can be kneaded like dough, and then squeezed out repeatedly against the inside of the mixing vessel as by means of a spatula or trowel. Mixtures have been satisfactorily made by hand, but mechanical mixers of suitable type may be utilized to provide more uniform mixing and are more readily adapted to handle the higher-melting-point masses. The purpose of the filler material is to completely fill the voids or interstices which exist in a closely packed assembly of ion exchange particles. The preferred ratio of water-saturated ion exchange particles to filler material, by weight, is approximately two to one, so that in the final diaphragm the filler material represents about one-third by weight thereof. The proportions of filler material may be varied to some extent, and mixtures containing up to three parts by weight of water-saturated resin to one part by weight of filler have been used. The filler material will usually comprise about ¼ to ⅓ of the volume of the diaphragm structure. However, too great an excess of filler material decreases the conductivity of the finished diaphragm, while too little is insufficient to fill all of the voids and also results in a crumbly diaphragm which has little tendency to hang together.

After the resin particles and binder have been thoroughly mixed, the resulting mass is placed in a frame or other suitable mold, and is spread out with a spatula or trowel to roughly fill the open frame area. By means of plates above and below the frame, as in a press, pressure may now be applied to the mixture within the frame so that it spreads out uniformly to fill the entire area. The amount of pressure necessary depends, of course, upon the rigidity of the particular filling material. However, pressures on the order of 10 lbs. p.s.i., or less, are usually satisfactory with the preferred type of filler materials used herein. Lower pressures may be used with the petrolatum-resin mixture, and higher pressures may be utilized with the petrolatum-wax-resin mixtures, the degree of pressure also depending upon the shape and thickness of the diaphragm to be produced. The pressure plates are then removed from the molded material, and the product within the frame is the ion exchange diaphragm of the invention. No curing times, pressures, or elevated temperatures are required. If desired, sheets of filter paper or the like may be placed on the inner surface of the pressure plates, on both sides of the diaphragm mixture, before the pressure is applied. By such means the removal of the plates without rupture of the diaphragm is facilitated. Such paper need not be removed when the diaphragm is placed in the electrolytic cell. Where the filler material is one having a low melting point, such as petrolatum, the diaphragms may also be prepared by heating the filler to a temperature above its melting point. In the case of petrolatum, such melting point may be in the range of from 92°–129° F. The resin particles are rapidly mixed with the molten filler, and the mass is allowed to cool down and solidify. At such temperatures and with a relatively short mixing period, the ion exchange resins are not damaged, nor is a substantial amount of water driven off. The mixture at the elevated temperature may either be cast into the frame and allowed to cool in the desired shape, or it may first be cooled and then pressure-molded in the manner described above.

Conducting diaphragms may also be produced by employing as filling and binding material hydrophobic gels such as may be prepared by gelling water-insoluble organic solvents or vegetable or animal oils with various gelling agents. Other materials, such as pitches and tars may also be used, if they possess the properties of being readily worked at low temperatures and will readhere after subdivision. The pitches, tars, and various gels produced by gelling the organic solvents are not as suitable as the petrolatum, amorphous wax, and petrolatum-amorphous wax mixtures, since they are more subject to leaching of the solvent constituent and to adverse effect by the acids and alkalies than are petrolatum and the amorphous waves.

Gel-type fillers may be made with mineral oils or such organic solvents as toluene or carbon tetrachloride and gelled with aluminum octoate. Substantially any organic liquid which is inert to the electrolytes employed in the electrolytic process may be gelled with substantially any soap of a polyvalent metal and a water-insoluble acid to produce a usable diaphragm. Hydrocarbons and halogenated hydrocarbons appear to be particularly suitable, and soaps of aluminum, magnesium and calcium and fatty acids having at least seven carbon atoms also appear to be most suitable. The amount of gelling agent will vary with the nature of the organic liquid and the gelling agent, as well as with the desired rigidity of the gel. With aluminum octoate as the gelling agent, and with such organic liquids as toluene, carbon tetrachloride or a very light mineral oil, a strong, flexible gel capable of readherence to form a cohesive mass after separation can be produced by employing two grams of dry aluminum octoate per 100 cc. of the liquid, although larger amounts up to 5 grams of aluminum octoate per 100 ccs. of the liquid may be employed. With other polyvalent soaps of fatty acids, such as magnesium or calcium soaps, and with other organic liquids, the amount of gelling agent may range from approximately 2% to 10% by weight. Organic solvent gels may also be produced by utilizing 1 to 2% of a polyamide gelling agent, for example, in the manner disclosed in U.S. Patent 2,662,068.

The gelling agent may be introduced and dissolved in the mineral oil or organic solvent at ordinary ambient temperatures, and the resulting liquid mixture may be admixed with water-saturated resin particles. The final mixture should contain just sufficient gel-forming material to fill the voids or interstices between the particles (proportions of 1 part gel material to 2 or 3 parts by weight of water-saturated resin being satisfactory), and the mixture can then be formed into any desired shape; for example, it can be cast or pressed into frames or packed between porous supporting walls of heavy cloth, plastic screen, and the like. Gel formation thereafter takes place to provide a solid conducting diaphragm. Alternatively, gel formation can be accomplished prior to mixing the gel material with the resin particles. Gel formation can be accelerated in either instance, if desired, by slightly raising the temperature of the mixture of solvent and gelling agent.

The diaphragms utilizing any of the aforementioned filler materials may be either unsupported—other than by the external frame, or may be supported by means of reinforcing screens or walls. Larger diaphragms may be prepared by using supporting walls, which may, for example, be of heavy cloth such as canvass, or of a screen or cloth woven from synthetic fibers resistant to acids and alkalies, such as fibers of polyvinylchloride. A plastic screen cloth commercially available under the trade name "Lumite" has been satisfactorily employed. The diaphragm material, for example, may be pressed between two sheets of such screen material. The screen thereby acts as a support, and relatively large diaphragms may be produced in this manner. Satisfactory diaphragms 6" x 12" in linear dimensions with a thickness of approximately ⅛" have been produced. Unsupported diaphragms of 3" x 5" by approximately ⅛" thick have also been successfully produced.

Figure 2:
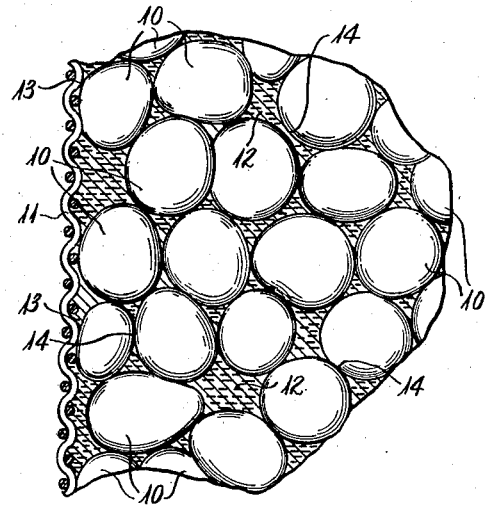
Fig. 2 is a fragmentary view similar to Fig. 1, but on a greatly enlarged scale.

Reference is made to the drawings for a further description of the diaphragm structure. An attempt has been made in Figs. 1 and 2 to show the internal structure of the diaphragm with the relation of the resin particles and filling material. In Fig. 1, particles of ion exchange resin 10 are confined between spaced supporting walls 11 of plastic screening material. As shown on an enlarged scale in Fig. 2, the interstices between the particles 10 are filled with the water-insoluble, pressure-deformable, non-conducting material 12, such as petrolatum, amorphous wax, petrolatum-wax mixtures, or gels. There are areas of contact 13 between the particles 10 and the plastic screen 11, and also areas of contact 14 between the particles themselves. Even if the particles of resin are not actually in contact with each other, they are in contact with thin films of water therebetween when the cell is in use. Ionic conduction can take place directly through such films of water and through the particles of ion exchange material as discussed above. The non-conducting material 12 substantially filling the interstices between the resin particles effectively blocks diffusion of water through the resin diaphragm except through the resin particles, and the diffusion of water through such particles is extremely slow. Non-conducting materials interrupt a major portion of conducting liquid paths between the two sides of the diaphragm, so that migration of molecules and ions through the diaphragm, between the particles of resin is substantially eliminated.

Figure 3:
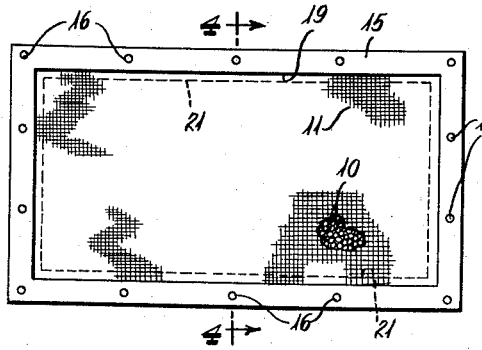
Fig. 3 is a side elevation of a frame adapted to be fitted into an electrolytic cell of the filterpress type, said frame having an ion exchange resin conducting diaphragm, of the type shown in Figs. 1 and 2, in place therein.
Figure 4:
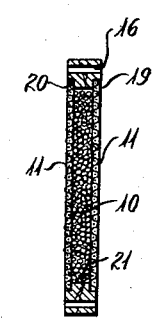
Fig. 4 is a sectional view taken on the line 4—4 of Fig. 3.
Figure 5:
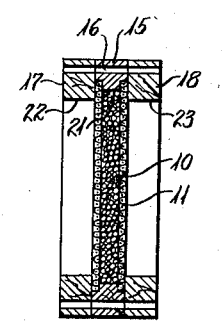
Fig. 5 is a sectional view similar to Fig. 4, but showing the frame of Fig. 4 between adjoining frames of an electrolytic cell.

In Figs. 3 and 4 there is shown a frame 15 which may be of plastic, Masonite, wood, or other material resistant to acids and alkalides, and which is adapted to fit in an electrolytic cell of the filterpress type. Bolt holes 16 are provided in the peripheral portions of such frame, whereby the frame may be assembled in the cell structure between adjoining frame members such as frame members 17 and 18 shown in Fig. 5. In the structure shown in Figs. 3-5, the frame member 15 has cut-out portions 19 and 20 around the internal periphery thereof to receive the plastic screens 11, between which the ion exchange particles 10 and filter material 12 have been pressed. The frame and diaphragm assembly is then fitted in the electrolytic cell structure as between the frames 17 and 18 on adjoining sides thereof. It will be noted that the frame opening 21 of the frame 15 supporting the diaphragm is somewhat larger than the frame openings 22 and 23 of the adjoining frames 17 and 18, respectively, so that when the cell is assembled as shown in Fig. 5, the edges of the diaphragm material and supporting walls are overlapped by the edges of the adjoining frames, thereby resulting in a keyed effect, facilitating the supporting of the diaphragm. This feature also aids in preventing leakage of the solution from the cell and between the compartments separated by the diaphragm.

Figure 6:
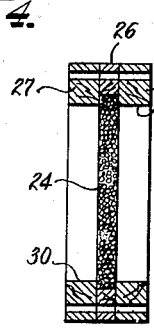
Fig. 6 is a sectional view similar to Fig. 5, but showing a modified form of ion exchange resin conducting diaphragm in the central frame of the assembly.

In Fig. 6, a diaphragm 24 of the unsupported type, is shown in place in its frame section 26 between adjoining frames 27 and 28. Such a diaphragm is made by simply pressing the pressure-deformable mass including the resin particles and filler material between plates on either side of the frame 26. The frame is then placed between the adjoining frames 27 and 28 in the cell assembly. In this modification, it will be noted that the opening 29 of diaphragm frame 26 is again larger than openings 30 and 31 of the adjoining frames 27 and 28, facilitating locking of the diaphragm in position and preventing leakage. Diaphragms of 3" x 5" in cross-sectional area, of the type shown in Fig. 6, have been made and used without support, except for the outer frame.

Figure 7:
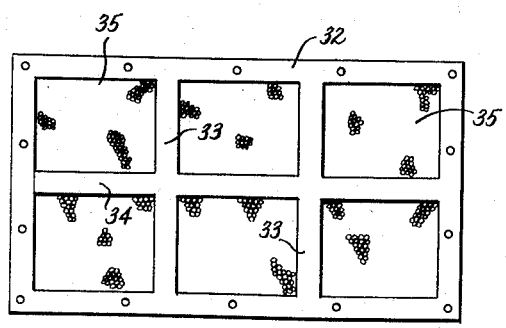
Fig. 7 is a side elevational view of a modified type of diaphragm supporting frame for an electrolytic cell, wherein such frame is particularly adapted to carry unsupported-type conducting diaphragms.

In Fig. 7, a frame member 32 is shown which is provided with a number of vertical cross pieces 33 and horizontal cross pieces 34. By this means the frame is divided into sections, each of which is provided with a diaphragm 35 of the unsupported type shown in Fig. 6. By utilizing frames with multiple sections, it is possible to incorporate unsupported type diaphragms in a cell structure of substantially any dimensions, thereby taking advantage of the direct contact of the diaphragm surface with the solutions on each side thereof.

By means of diaphragms of the type disclosed, demineralization of solutions has been effected at electrical current efficiencies as high as 75 to 85%.

The invention will be further illustrated by the following examples of practice:

*Example 1*

A quantity of ion exchange resin beads of the anionic type, marketed under the name "Amberlite IRA–400," of 20 to 50 mesh was thoroughly saturated by soaking in water overnight, and was then flash-dried in a Buchner funnel for approximately 10 minutes to remove free excess water. The resulting resin contained approximately 42% water. ("Amberlite IRA–400" is described by the manufacturer as a strongly basic amine-type anion exchange resin, and is said to be covered by U.S. Patent 2,591,573.) A petrolatum-wax mixture was prepared by melting a commercially obtained petrolatum with an amorphous wax having a melting point of 65° C., derived by refining petrolatum material, in 1 to 1 proportions by weight. The resulting mixture had a melting point of approximately 60° C. After cooling the petrolatum-wax mixture to approximately room temperature, the saturated Amberlite IRA-400 resin beads were mixed with a portion of such filler material, in proportions of two parts of resin beads to one part of filler. The mixing was done by kneading the materials in a beaker with a spatula. The resulting mixture was troweled into a frame having a 3" x 5" opening and positioned upon a glass plate. After filling the frame with the resin-petrolatum-wax mixture, a glass plate was placed on top of the materials, and pressure was applied by hand to the top plate to thereby force the mixture to conform to and fill the entire frame area. The glass plates were then removed and the resulting diaphragm remained within the frame, and constituted a diaphragm structure 3" x 5" in linear dimensions by 1/8" thick.

*Example 2*

In order to test the acid resistance and barrier action of the diaphragms of the present invention, a diaphragm made by the process of Example 1 was placed between a 10% solution of sulfuric acid and pure water. After standing for 24 hours, the acid concentration on the sulfuric acid side of the separating diaphragm was determined by titration to be 9.75%. The diaphragm was unattached by the acid. The slight decrease in concentration of the acid is to be attributed to the thermal diffusion and is evidenced by all types of ion exchange diaphragms and films.

*Example 3*

An ion exchange diaphragm containing IRA-400 anionic ion exchange resin produced by the method disclosed in Example 1, was placed in a two-compartment electrolytic cell to provide the separating diaphragm thereof, and the cell was used for electrolytic treatment of a synthetic waste pickle liquor. The cell is illustrated schematically by the diagram below:

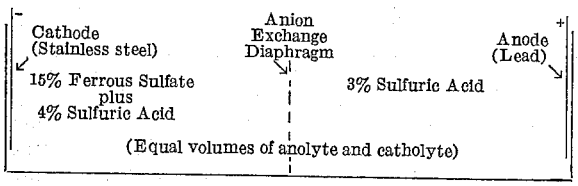

A solution containing approximately 15.2% FeSO₄ and 4% H₂SO₄ (representing a waste pickle liquor) was placed in the cathode compartment of the cell, and an aqueous solution containing approximately 3% H₂SO₄ was placed in the anode compartment of the cell. The 3% H₂SO₄ solution in the anode compartment was for the purpose of increasing the initial conductivity of the cell. However, pure water could be used. Electrolysis was conducted at 6 volts until the FeSO₄ concentration of the catholyte was about 2½%. The purpose of the electrolysis was to plate out pure iron at the cathode and simultaneously produce a high concentration of acid in the anode compartment. At the end of the experiment, the percentage of iron plated out was found to be 70%. The concentration of the H₂SO₄ produced in the anode compartment was approximately 15%. The process was carried out at a current efficiency of 51% on the basis of iron actually plated out. Of the FeSO₄ in the spent pickle liquor initially in the cathode compartment, 70% was plated out as iron, 18% was left behind as residue, and 12% diffused into the anolyte compartment. The percentage of the iron diffused to the anode compartment does not represent a loss of iron, because the acid anolyte containing a small percentage of FeSO₄ may be reused as pickle liquor, and the spent liquor may be again retreated electrolytically in a subsequent stage of the process. The temperatures of the conducting solutions did not rise above about 35° C. in the foregoing process, and the conducting diaphragm remained stable throughout. In further experiments the ion-exchange resin-petrolatum-wax diaphragms have shown stability up to 50° C.

*Example 4*

A quantity of Amberlite IR-120 resin beads of 20 to 50 mesh, defined by the manufacturer as a high-density, nuclear sulfonic acid type cation exchange material, was exhausted to the magnesium form by three successive treatments with a 15% MgSO₄ solution. The magnesium-exhausted solution-saturated resin beads were then mixed in two-to-one proportions by weight, with the pressure-deformable, amorphous wax "Sherowax 40" without petrolatum addition. Mixing was carried out by hand at room temperature. The wax-resin mixture was then formed into a diaphragm by pressing it into a frame. The cross-sectional area of the diaphragm was 1 sq. in. The resulting structure constituted an electrically conducting diaphragm of the cationic exchange type.

*Example 5*

A quantity of Amberlite IRA-400, 20-40 mesh, resin beads was exhausted to sulfate form by three successive treatments with a 15% MgSO₄ solution. The resulting sulfate-exhausted solution-saturated resin material was mixed in 2 to 1 proportions by weight with pressure-deformable wax, Sherowax 40, as previously described. The wax-resin mixture was then pressed into a frame to form a diaphragm of cross-sectional area of 1 sq. in. The resulting structure constituted an electrically conducting diaphragm of the anionic type.

*Example 6*

The magnesium-exhausted cationic resin diaphragm of Example 4 and the sulfate-exhausted anionic resin diaphragm of Example 5 were placed in a three-compartment electrolytic cell in the manner shown schematically in the following diagram:

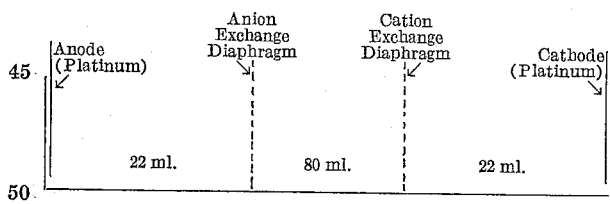

All three compartments of the cell were filled with an aqueous solution containing 5000 p.p.m. of sodium sulfate and 5000 p.p.m. of magnesium sulfate. Electrolysis was conducted at 6 volts and an average current of 0.0072 ampere for a period of 21 hours. At the end of this experiment, the pH of the central compartment was 6.2, the pH of the catholyte was 11.2, and the pH of the anolyte was 1.3. The resin diaphragms showed no appreciable deterioration. Analysis of the contents of the middle compartment before and after electrolysis disclosed selective removal of MgSO₄ to NaSO₄ at a ratio of about 1.85 to 1.

*Example 7*

A quantity of cation exchange resin beads known as "Amberlite IR-120" and said by the manufacture to be a high-density, nuclear sulfonic acid type exchange resin, was soaked in water until substantially saturated. The resin was then flash-dried on a Büchner funnel for about one minute. A gelling medium was prepared by mixing 7.5 grams of aluminum octoate with about 150 ml. of kerosene at room temperature. The resin beads were then mixed at room temperature with the gelling medium in proportions of about two-to-one by volume. The mixture was then pressed down by hand into a container and excess gelling medium was poured off to leave just a surface layer of such medium over the ion exchange beads. The resulting mass was then placed in an oven at 75° to 80° C. for about 20 to 30 minutes. After cooling, the resulting resin-gel mass was quite rubbery and elastic and portions thereof would readhere after separation, to form a compact mass. The gel-like mixture was placed in a frame between supporting partitions, as shown in Fig. 1, and was pressed to fill the voids thereof. A similar diaphragm was produced by the same procedure but by using anion exchange resin beads of the type commercially available under the trade name "Nalcite SAR." The resulting diaphragm was of the conducting anion exchange resin type. The two diaphragms were placed in a three-compartment electrolytic cell to provide the separating partitions thereof, and the resulting cell was successfully used for demineralization of a 1500 p.p.m. sodium sulfate solution. All three compartments of the cell were initially filled with sodium sulfate solution of 1500 p.p.m. After electrolyzing for one and a half hours, the middle compartment was analysed for total solids, and was found to contain 240 p.p.m. Continued electrolysis for 12 hours at 15 milliamperes resulted in substantially complete removal of electrolyte from the middle compartment of the cell. Analysis showed the middle compartment of the cell to have a total solids content of 26 p.p.m.

In all of the diaphragm structures described above, the nature of the filler material was such that the physical position of the resin beads in the diaphragm could be shifted or moved without cracking or otherwise destroying these diaphragms. Thus, any leaks or punctures accidentally occurring in the diaphragm are readily mended by merely pressing the diaphragm together in the vicinity of the hole so that the filler material readheres to fill the gap. The diaphragms are in effect self-sealing. A further advantage of the novel diaphragms resides in the fact that the resin particles can be readily recovered for regeneration or reuse. Thus, the filler material, if of the petrolatum or amorphous wax type, can readily be removed by dissolution in a suitable organic solvent. The beads recovered by filtration or other method of separation can be regenerated as desired and used for making other diaphragms of different size or configuration, or for other purposes. If a gel-type filler material is employed, such gel may be broken by acid treatment, and the resin beads recovered from the resultant liquid. It will be apparent that the present diaphragms permit widespread use of conducting diaphragms for a variety of purposes. The cost of the diaphragms is but a fraction of that of diaphragms known heretofore.

This application is a continuation-in-part of my co-pending application S.N. 358,329, filed on May 29, 1953, now abandoned.

I claim:

1. A conducting diaphragm for an electrolytic process, consisting essentially of: discrete particles of ion exchange resin having portions in contact to provide a network of interstices extending between said particles, and a pressure-deformable, non-conducting, water-insoluble, jelly-like material substantially filling said network of interstices and binding said particles together, said jelly-like material having the property after separation of readherence at temperatures below its melting point and below the boiling point of water to form a cohesive unitary mass and being selected from the group consisting of petrolatum, amorphous wax, petrolatum-amorphous wax mixtures, hydrocarbon gels and organic solvent gels.

2. The diaphragm as defined in claim 1, in which said ion exchange resin is anion exchange resin whereby anions can migrate through said diaphragm but migration of cations through said diaphragm is resisted.

3. The diaphragm as defined in claim 1 in which said ion exchange resin is cation exchange resin whereby cations can migrate through said diaphragm but migration of anions through said diaphragm is resisted.

4. The diaphragm as defined in claim 1 in which the particles of said ion exchange resin are substantially saturated with an aqueous liquid.

5. The diaphragm as defined in claim 1 in which said ion exchange resin particles are substantially saturated with an aqueous liquid and said non-conducting, jelly-like material is petrolatum.

6. The diaphragm as defined in claim 1 in which said ion exchange resin particles are substantially saturated with aqueous liquid and said non-conducting, jelly-like material is an amorphous wax having a melting point below the boiling point of water and capable of being mechanically worked at temperatures below its melting point.

7. The diaphragm as defined in claim 1 in which said ion exchange resin particles are substantially saturated with aqueous liquid and said non-conducting, jelly-like material is a mixture of petrolatum and amorphous wax.

8. The diaphragm as defined in claim 1 in which said ion exchange resin particles are substantially saturated with aqueous liquid and said non-conducting, jelly-like material is an organic liquid gelled with a water-insoluble soap.

9. The diaphragm as defined in claim 1 in which said ion exchange resin particles are substantially saturated with an aqueous liquid and said non-conducting, jelly-like material is a liquid hydrocarbon gelled with aluminum octoate.

10. A conducting diaphragm, comprising: spaced walls of acid- and alkali-resistant, non-conducting sheet material, said walls having openings therein permitting passage of liquids; particles of ion exchange resin packed between said spaced walls with said particles in contact with each other and with said walls and providing a network of interstices extending between said particles; and a pressure-deformable, non-conducting, jelly-like material selected from the group consisting of petrolatum, amorphous wax, petrolatum-amorphous wax mixtures, hydrocarbon gels and organic solvent gels substantially filling said network of interstices and retaining said particles between said spaced walls.

11. A conducting diaphragm structure for separating an electrolytic cell into compartments, said diaphragm structure comprising: a frame having inner edges defining an opening therein, said frame being adapted to be placed between adjacent frame sections of said electrolytic cell; and a conducting diaphragm of ion exchange resin particles positioned within the opening in said frame, said particles having portions in contact to define a network of interstices between said particles, said interstices being filled with a non-conducting, pressure-deformable, water-insoluble, jelly-like material having adhesive properties selected from the group consisting of petrolatum, amorphous wax, petrolatum-amorphous wax mixtures, hydrocarbon gels and organic solvent gels, said material sealing said diaphragm to said inner edges of said frame.

12. The conducting diaphragm structure as defined in claim 11, in combination with an electrolytic cell having a plurality of frame sections, wherein the opening in the diaphragm frame is larger than the opening in the adjacent frames between which it is adapted to be placed, whereby the edges of said conducting diaphragm may be locked between the adjacent frame sections.

13. The conducting diaphragm structure as defined in claim 11, wherein the diaphragm frame is provided with dividing members defining a plurality of openings therein, and a conducting diaphragm is positioned within each of said openings.

14. The conducting diaphragm structure as defined in claim 11 wherein the diaphragm frame is provided with a screen of non-conducting material extending across said opening therein and supporting said conducting diaphragm.

15. The conducting diaphragm structure as defined in claim 14, wherein a screen of non-conducting material is provided on each side of said conducting diaphragm to form supporting walls therefor.

16. The process of making a conducting diaphragm which process comprises saturating ion exchange resin particles with an aqueous liquid, mixing said saturated ion exchange resin particles in about 1-to-1 to 3-to-1 proportions by weight with a non-conducting, jelly-like, water-insoluble, filler material capable of adhering to itself at temperatures below its melting point and below the boiling point of water to form a cohesive, unitary mass selected from the group consisting of petrolatum, amorphous wax, petrolatum-amorphous wax mixtures, hydrocarbon gels and organic solvent gels; and forming the resulting mixture into a relatively thin, flexible sheet, said mixing and forming being conducted at a temperature below the boiling point of water.

17. The process of claim 16 wherein said filler material is petrolatum and the mixing and forming are conducted at substantially room temperatures.

18. The process as defined in claim 16 wherein the filler material is a mixture of petrolatum and an amorphous wax, and the mixing and forming are conducted at substantially room temperatures.

19. The process as defined in claim 16 wherein the filler material is an amorphous wax, and the mixing and forming are conducted at substantially room temperatures.

20. The process of making a conducting diaphragm, comprising: mixing discrete particles of ion exchange resin substantially saturated with an aqueous liquid with a molten, normally-jelly-like, non-conducting, filler material which resists wetting by said aqueous liquid, said non-conducting, normally-jelly-like material having a melting point above room temperature and below the boiling point of water and being selected from the group consisting of petrolatum, amorphous wax, petrolatum-amorphous wax mixtures, hydrocarbon gels and organic solvent gels, the mixing of the resin particles with said filler material being conducted within such temperature range; forming the resulting fluid mixture into a relatively thin sheet; and thereafter cooling the resulting structure to cause said non-conducting filler material to form a jelly-like supporting mass for said resin particles.

References Cited in the file of this patent
UNITED STATES PATENTS

| | | |
|---|---|---|
| 1,358,858 | Krejci et al. | Nov. 16, 1920 |
| 2,636,851 | Juda et al. | Apr. 28, 1953 |
| 2,681,319 | Bodamer | June 15, 1954 |
| 2,681,320 | Bodamer | June 15, 1954 |
| 2,774,108 | Wyllie | Dec. 18, 1956 |
| 2,820,756 | Wyllie | Jan. 21, 1958 |